United States Patent
Hobson (10) Patent No.: US 9,569,421 B2
(45) Date of Patent: Feb. 14, 2017

(54) METHOD AND SYSTEM FOR IMPROVED LANGUAGE IDENTIFICATION USING LANGUAGE TAGS

(71) Applicant: EXCALIBUR IP, LLC, Sunnyvale, CA (US)

(72) Inventor: Jay Hobson, Fremont, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 998 days.

(21) Appl. No.: 13/664,561

(22) Filed: Oct. 31, 2012

(65) Prior Publication Data
US 2014/0122055 A1    May 1, 2014

(51) Int. Cl.
| | | |
|---|---|---|
| G06F 17/20 | (2006.01) | |
| G06F 17/00 | (2006.01) | |
| G06F 17/27 | (2006.01) | |
| G06F 17/21 | (2006.01) | |
| G06F 9/44  | (2006.01) | |

(52) U.S. Cl.
CPC .......... G06F 17/275 (2013.01); G06F 9/4448 (2013.01); G06F 17/218 (2013.01)

(58) Field of Classification Search
CPC ..................................................... G06F 17/20
USPC ............................................................ 704/8
See application file for complete search history.

(56) References Cited

U.S. PATENT DOCUMENTS

| | | | | |
|---|---|---|---|---|
| 8,682,640 | B2* | 3/2014 | Jaiswal ................ | G06F 17/289 704/2 |
| 2009/0070098 | A1* | 3/2009 | Patryshev ............ | G06F 3/0238 704/3 |
| 2009/0132233 | A1* | 5/2009 | Etzioni ................. | G06F 17/28 704/3 |
| 2011/0033095 | A1* | 2/2011 | Hale ................... | G06F 17/2785 382/131 |
| 2011/0125486 | A1* | 5/2011 | Jaiswal ................ | G06F 17/289 704/3 |
| 2015/0142813 | A1* | 5/2015 | Burgmeier ........ | G06F 17/30011 707/740 |
| 2015/0161097 | A1* | 6/2015 | Swerdlow ............ | G06F 17/275 704/9 |

* cited by examiner

*Primary Examiner* — David Hudspeth
*Assistant Examiner* — Timothy Nguyen
(74) *Attorney, Agent, or Firm* — James D. DeCarlo; Greenberg Traurig, LLP (57) ABSTRACT

Disclosed herein is an ability to identify a supported language. A current language tag including one or more subtags, each subtag providing language identification information. In response to determining that a language referenced by the current language tag is not a supported language, accessing a stored set of mappings including one or more mappings, each mapping associating a first language tag with a second language tag, determining whether or not a mapping in the set of mappings includes the current language tag as one of the first and second language tags and a new language tag as the other of the first and second language tags, and using the new language tag as the current language tag to identify the supported language.

21 Claims, 10 Drawing Sheets

METHOD AND SYSTEM FOR IMPROVED LANGUAGE IDENTIFICATION USING LANGUAGE TAGS

FIELD OF THE DISCLOSURE

The present disclosure relates generally to internationalization and localization, and more particularly to language tags, such as Internet Engineering Task Force (IETF) language tags, used in language identification, and improvements in language identification using such language tags.

BACKGROUND

Conventionally, a language tag may comprise a number of subtags separated by a delineator, e.g., a hyphen. For example, a language tag typically has a primary language subtag and a number of other subtags, e.g., extended language, script, variant, region, extension subtags, and optional private use subtags. A registry, e.g., the Language Subtag Registry maintained by Internet Assigned Numbers Authority (IANA), provides an example of an entity that provides a listing of subtags. Typically, such a registry does not list private-use subtags, which are typically implementation-dependent third-party tags.

An application or other programming executed by a computing system, such as without limitation a server computer and/or client device, may use language tags to determine a language to be used to interact with a user. By way of a non-limiting example, a language tag may be used to identify a language for displaying a web page, application data, etc. at a user's computing device. By way of another non-limiting example, a language tag may be used to store and/or organize data, determine a keyboard layout, etc.

Languages, e.g., human languages, are quite complex, e.g., a language may have a number of variants and/or dialects, which make using language subtags, or other language coding schemes quite complex. For example, there are a number of variations in the English language used in different countries, e.g., the United States, United Kingdom, Australia, etc., and one English-language subtag may not sufficient for a given use.

SUMMARY

A mechanism may be used to parse a language tag to identify a language that supported by an entity, e.g., an application, system and/or web site provider. To find a language that is supported, one mechanism that may be used with BCP 47, a language tag standard, commences with a language tag in its most specific form, i.e., initially using all of the subtags in an effort to identify a supported language, and where support is not found progressively removing a subtag in order to find a language that is supported, e.g., a file exists containing translations for the target language.

To illustrate using the language tag, en-GB-x-1812, a determination is made whether the language identified by the private use subtag, x-1812, is supported. The private use subtag might by a variant of British English, for example. If the variant identified by the private use subtag is not supported, the private use subtag, x-1812, is ignored, e.g., truncated or removed, so that en-GB remains. The remaining portion of the language tag includes a primary subtag, en, that identifies the English language as the default language, and a more specific subtag, -GB, which identifies British English. The mechanism then determines whether British English is supported. If the mechanism determines that British English is not supported, the -GB subtag is removed from the language tag, which identifies a default English language. This approach may be referred to as a "fall back" approach, since the mechanism falls back from a more specific language to a less specific alternative where the more specific alternative is determined to not be supported.

A fall back approach is not optimal for a number of reasons, including the fact that each time the fall back mechanism is used the language alternative becomes less specific, and may ultimately result in the use of a default language being used. In order to avoid such an outcome, an entity that is providing language support has to provide support for a number of language variants, which is not feasible. In the above example, assume that an end user's preference is Australian English, which is derived from, or more closely resembles, British English, and that the default English language is not British English or Australian English. Since Australian English is not specified in the language tag, a fall back approach results in a default English being selected, unless the language support entity provided support for both British English and Australian English. If support for both British English and Australian English variants is not provided, a default English language, e.g., U.S. English, is selected instead of Australian English, which is preferred by the user, and instead of British English, which is more closely aligned with the user's preferred language, Australian English.

Embodiments of the present disclosure address these and other problems, and provide a mapping ability, which allows a language tag to be mapped to another language tag, which mapping ability may be used in identifying a supported language. Suppose that an entity that is providing language support wishes to support two versions of English, e.g., US English, en-US, and British English, en-GB. In accordance with at least one embodiment, using the language tag in the above example, i.e., en-GB-x-1812, the primary tag, en, may be mapped to another tag, en-US, so that in the above example, the primary tag, en, the yields US English rather than a default, general English. It may be said that such a mapping from a less specific tag, en, to a more specific tag, en-US, provides an ability to "fall forward", e.g., from less specific to more specific, to find a supported language. In the example provided above, rather than "falling back" to a general English language, the mapping provides a mechanism to "fall forward" from the general language to a more specific language, US English. Using mapping to "fall forward" may be used by an entity to provide support for both US English and British English without modifying its language tags.

As yet another non-limiting example using the same language tag, en-GB-x-1812, assume that an entity wishes to support Australian English rather than British English. Embodiments of the present disclosure provide an ability to map one language tag that has a level of specificity to another language tag with a similar level of specificity, such as a mapping of an en-GB language tag to and en-AU language tag. Such a mapping may be referred to as a lateral mapping that results in a "side step" from British English to Australian English. In this case, when support for en-GB is not found, the mapping from en-GB to en-AU is found and the mapping may be used to "side step" British English, which is not supported, to Australian English, which is supported.

Embodiments of the present disclosure may be used with any type of language tag syntax and/or subtag types, including private use tags. Embodiments of the present disclosure may be used with a number of language tag standards, including BCP-47, to map laterally/across, forward and/or backward to a supported language. BCP-47 stands for Best Current Practice and is a name associated with a series of RFCs, e.g., RFC 4646 and RFC 5646, for describing language tag, or language identifier, standards. BCP-47 and associated RFCs are incorporated herein by reference.

As yet another example, mapping provided in accordance with one or more embodiments of the present disclosure may be used with a legacy product, e.g., a legacy application, system, etc. Embodiments of the present disclosure may be used to map a "legacy tag," e.g., a tag that uses an Obsolete syntax, with a language tag that uses a different syntax, e.g., a standardized language tag syntax such as that adopted in RFC 4646. In so doing, the legacy tag and the product that uses the legacy tag need not be modified to conform to the standardized syntax. By way of a non-limiting example, under BCP 47 and RFC 4646, a zh-Hant-TW language tag is valid and comprises a primary language subtag, zh, for Chinese, a script subtag, Hant, a traditional variant, and region subtag, TW, Taiwan Province of China. A fallback mechanism under BCP 47 and RFC 4646 would start with TW, fallback to Hant if no support is found for Taiwanese, and fallback to zh if no support is found for the traditional variant. However, if a legacy tag, zh-zh is presented, the fallback mechanism under BCP 47 and RFC 4646 would not be able to process the tag because the legacy tag is not considered to be a properly formatted language tag, and would result in a determination that the legacy tag is an invalid language identifier, e.g., the rightmost zh would not be interpreted as a valid region subtag. Embodiments of the present disclosure may be used to map the legacy tag, which may use obsolete or incorrect syntax, to a properly formatted language tag that may be understood, By way of a non-limiting example, zh-zh, which tag is not considered to use proper syntax under RFC 4646 and may not be understood to refer to a traditional variant of Chinese, might be mapped to zh-Hant, which uses proper syntax under RFC 4646 for a traditional variant of Chinese.

In accordance with one or more embodiments, a method is provided, comprising: in response to a request to identify a supported language that has a set of translations for use in translating content, at least one computing device using a current language tag to identify the supported language; the current language tag comprising one or more subtags, each subtag providing language identification information; in response to determining that a language referenced by the current language tag is not the supported language, the at least one computing device performing elements comprising: accessing a stored set of mappings comprising one or more mappings, each mapping associating a first language tag with a second language tag; determining whether or not a mapping in the set of mappings includes the current language tag as one of the first and second language tags and a new language tag as the other of the first and second language tags; and using the new language tag as the current language tag to identify the supported language.

In accordance with another aspect, a system is provided, which system comprises at least one computing device comprising one or more processors to execute and memory to store instructions to: in response to a request to identify a supported language that has a set of translations for use in translating content, use a current language tag to identify the supported language, the current language tag comprising one or more subtags, each subtag providing language identification information; in response to determining that a language referenced by the current language tag is not the supported language, perform elements comprising: accessing a stored set of mappings comprising one or more mappings, each mapping associating a first language tag with a second language tag; determining whether or not a mapping in the set of mappings includes the current language tag as one of the first and second language tags and a new language tag as the other of the first and second language tags; and using the new language tag as the current language tag to identify the supported language.

In accordance with yet another aspect, a computer readable non-transitory storage medium is provided, the computer readable non-transitory storage medium for tangibly storing thereon computer readable instructions that when executed cause at least one processor to: in response to a request to identity a supported language that has a set of translations for use in translating content, use a current language tag to identify the supported language, the current language tag comprising one or more subtags, each subtag providing language identification information; in response to determining that a language referenced by the current language tag is not the supported language, perform elements comprising: accessing a stored set of mappings comprising one or more mappings, each mapping associating a first language tag with a second language tag; determining whether or not a mapping in the set of mappings includes the current language tag as one of the first and second language tags and a new language tag as the other of the first and second language tags; and using the new language tag as the current language tag to identify the supported language.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, provides an overview of a language identification process flow using mapping in accordance with one or more embodiments of the present disclosure.

FIG. 6, which comprises FIGS. 6A and 6B, provides an example of a language identification process flow that uses user preferences and mapping in language identification in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

Certain embodiments of the present disclosure will now be discussed with reference to the aforementioned figures, wherein like reference numerals refer to like components.

In general, the present disclosure includes a system, method and architecture for improved language identification using language tags, or language identifiers.

Figure 1A:
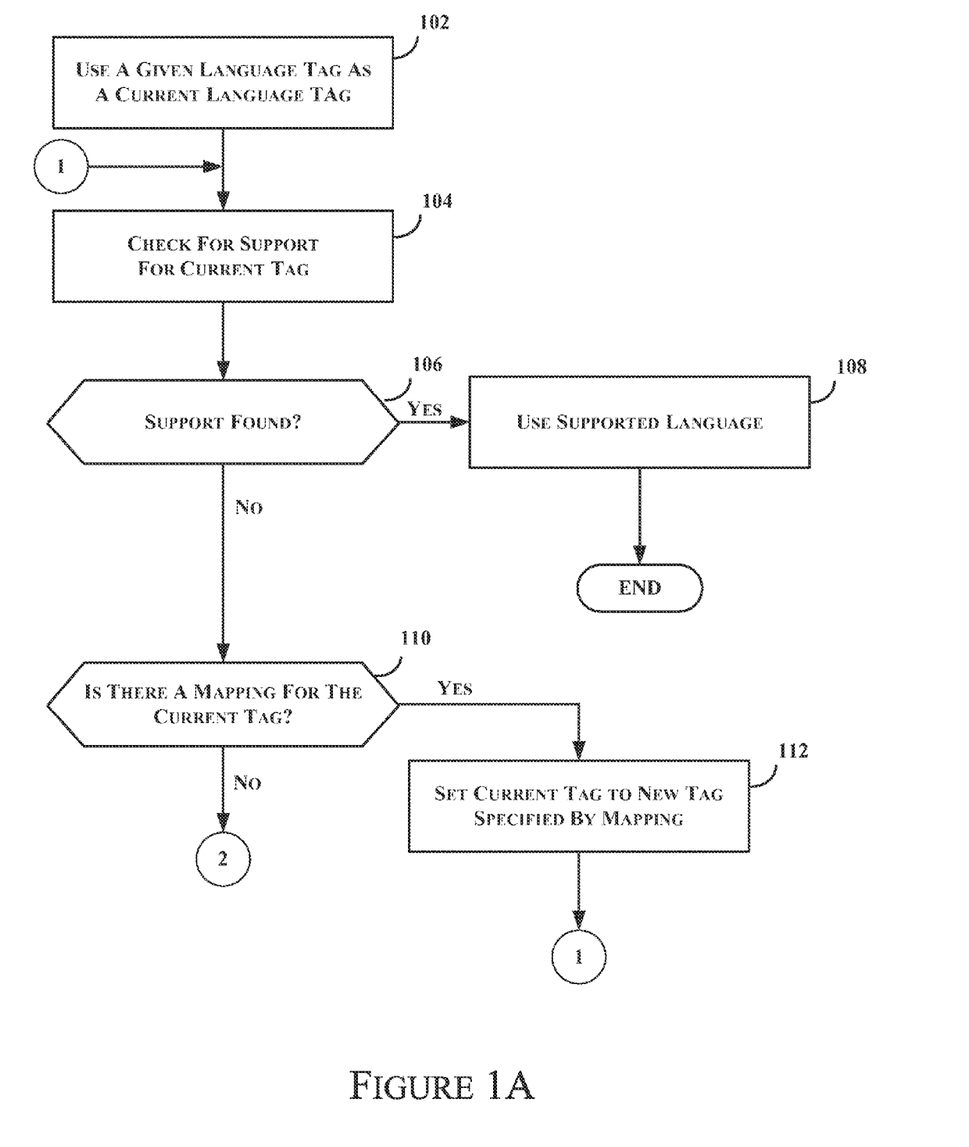
Figure 1B:
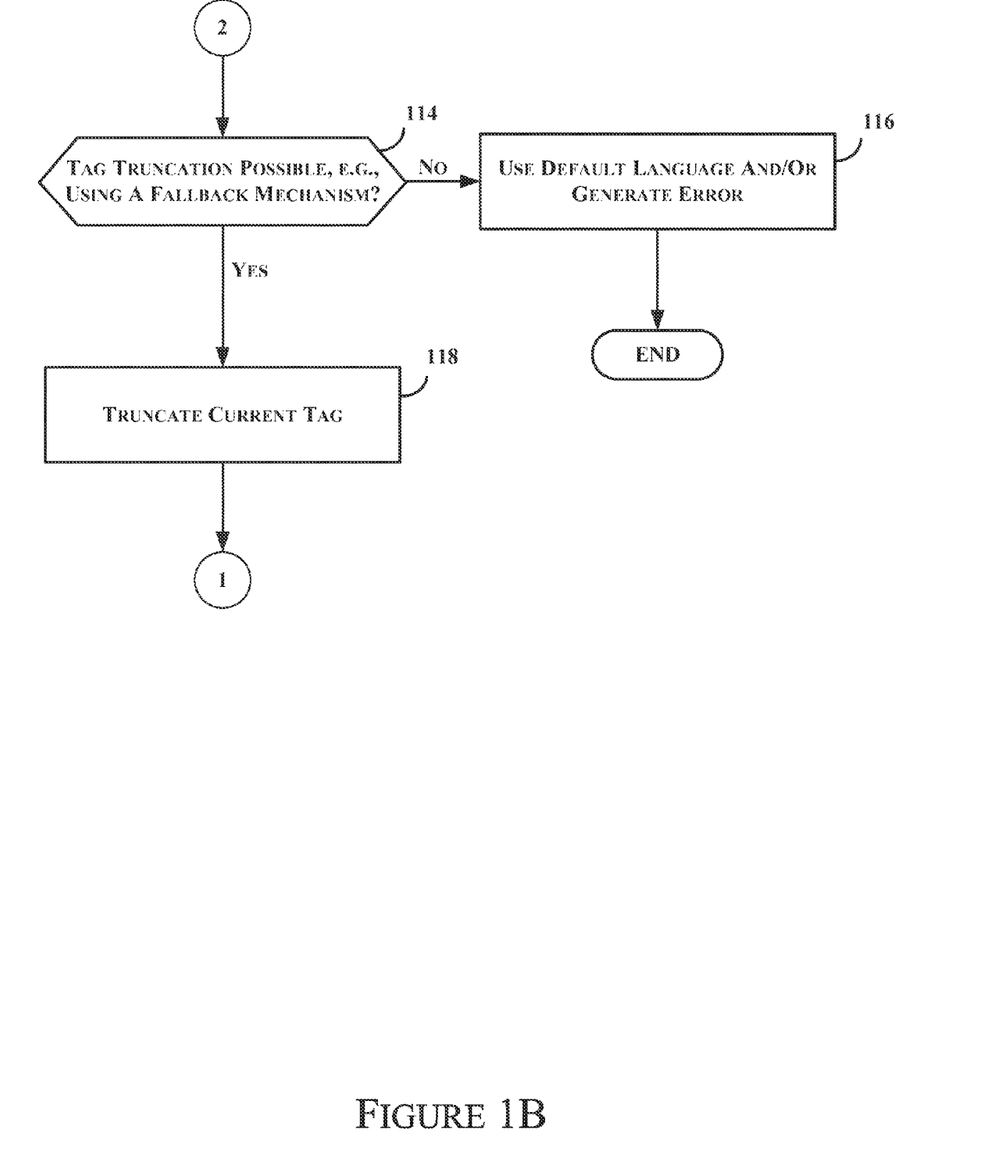

FIG. 1, which comprises FIGS. 1A and 1B, provides an overview of a language identification process flow using mapping in accordance with one or more embodiments of the present disclosure. At step 102, a given language tag is used as the current language tag. At step 104, a check is made to determine whether or not the language referenced by the current language tag is a supported language. A determination is made, at step 106, whether support was found at step 104. If so, processing continues at step 108 to use the supported language.

If it is determined, at step 106, that there is no support for the language specified by the current tag, processing continues at step 110 to determine whether there is a mapping for the current tag. In accordance with one or more embodiments, a mapping for the current tag includes the current tag and associates the current tag with another tag specified in the mapping. As described herein, the mapping may be a pre-defined or pre-stored mapping. If there is a mapping, the current tag is replaced with the other tag, and processing continues at step 104 to check whether or not there is language support for the current tag, i.e., the other tag specified by the mapping. If it is determined, at step 110, that there is no mapping, processing continues at step 114 of FIG. 1B. At step 114, a determination is made whether or not the current tag may be truncated, e.g., by removing a sub tag from the current tag. As discussed herein, the truncation may be a fallback, such that the truncation falls back to a less specific reference by removing the subtag that is currently the most specific subtag from the current tag. If the current tag cannot be truncated, processing continues at step 116 to use a default language and/or to generate an error. If it is determined, at step 114, that the current tag may be truncated, processing continues at step 118 to truncate the current tag. Processing continues at step 104 to check for language support for the current tag, e.g., the tag generated by removing a portion, such as a subtag, of the current tag.

Figure 2:
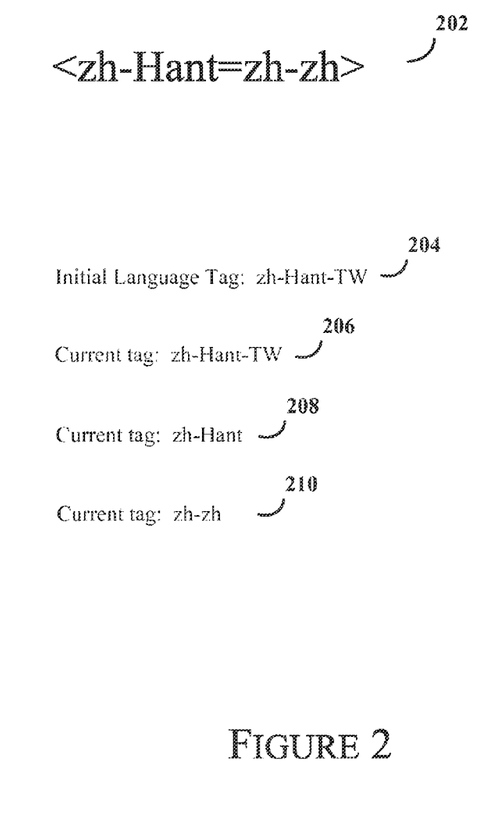
FIG. 2 provides a language identification example in accordance with one or more embodiments of the present disclosure.

FIG. 2 provides a language identification example in accordance with one or more embodiments of the present disclosure. In accordance with one or more embodiments, a mapping associates one language tag, which may comprise one or more sub tags, with another language tag, which may comprise one or more sub tags. In accordance with one or more such embodiments, a mapping may be expressed as a key, value pair, such as shown in mapping 202. In the example, the key and value are language tags, and the pairing, which may use any delimiter including "=" used in the example of FIG. 2, represents an association between the language tags and the languages represented by the language tags. By way of one non-limiting example, the association may be interpreted as a "from-to" relationship, whereby the association is from one language to another language. By way of a further non-limiting example, the pairing may be read from left to right or vice versa. Furthermore, it should be apparent that any mechanism may be used to associate one language tag, or identifier, with another language tag, or identifier. The mapping may map, or associate, a valid language tag and an invalid language tag, a less specific language tag and a more specific language tag, two language tags with equal specificity, a legacy language tag with a language tag that conforms to a given standard, etc.

As shown by element 204, the initial tag is zh-Hant-TW, which specifies the Chinese language, zh, and more particularly a traditional variant of the Chinese language, Hant, and even more particularly a traditional variant of Chinese, TW, spoken in the Taiwan, a province of China. In the example, there is support for a traditional variant of Chinese; however, the traditional variant that is supported is identified using a different, non-standard language tag, zh-zh.

Referring again to FIG. 1A, the initial tag shown in element 204 is set as the current language tag in step 102. The current tag is shown in element 206. At steps 104 and 106, it is determined that the specific variant of Chinese, Taiwanese Chinese, as indicated by the initial/current tag, is not supported, and processing continues at step 110. A determination is made, at step 110, whether or not there is a mapping from the current tag to another tag. As indicated in element 202, there is no such mapping, and processing continues at step 114 of FIG. 1B.

At step 114, a determination is made whether or not it is possible to truncate the current tag. In accordance with one or more embodiments, truncation is performed by removing the most specific subtag from the current tag; and truncation is determined to be possible where the current tag comprises at least two subtags prior to truncation, such that removal of a subtag will not result in an empty current tag. In other words, where truncation would result in an empty tag, there would be nothing remaining in the current tag to use to identify a supported language, and truncation would not be useful. Where truncation is not possible, a default supported language might be identified. If truncation would not result in an empty current tag, processing continues at step 118 to truncate, or remove, a subtag, e.g., the most specific subtag in the current tag. In the example, the region subtag, TW, is removed from the current tag, which yields zh-Hant as the current tag, which is shown in element 208.

Processing continues at step 104 of FIG. 1A to check for support for the current tag, i.e., zh-Hant. At step 106, it is determined that there is no support for the language indicated by the current tag, and processing continues at step 110. A determination is made, at step 110, whether or not there is a mapping from the current tag, zh-Hant, to another tag. As indicated in the element 202, there is a mapping, and processing continues at step 112 to change the current tag to zh-zh based on the mapping element 202. In other words, using the mapping provided by mapping element 202, the current tag is changed from zh-Hant to zh-zh, and the new, current tag is shown in element 210. Processing continues at step 104 of FIG. 1A. At steps 104 and 106, it is determined that a traditional variant of Chinese referenced by the zh-zh language tag is supported, and processing continues at step 108 to use the supported language.

In accordance with one or more embodiments, a supported language, which may be identified using one or more embodiments of the present disclosure, may be used to translate a display, such as a web page display, which may then be provided to the user. In accordance with one or more embodiments, a file may be associated with a given language tag, which file may contain translations that may be used to translate content, such as the content, or some portion of the content, that is to be provided to a user. The check at step 104 and/or determination made at step 106 may be performed based on whether or not a translation file, or other file, exists for the current language tag, or identifier. Additionally or alternatively, a determination such as that made at step 104 may be made by referring to a set of language tags associated with an entity that is providing the language support. The set of language tags may comprise a listing of one or more language tags, each one representing a supported language.

Figure 3:
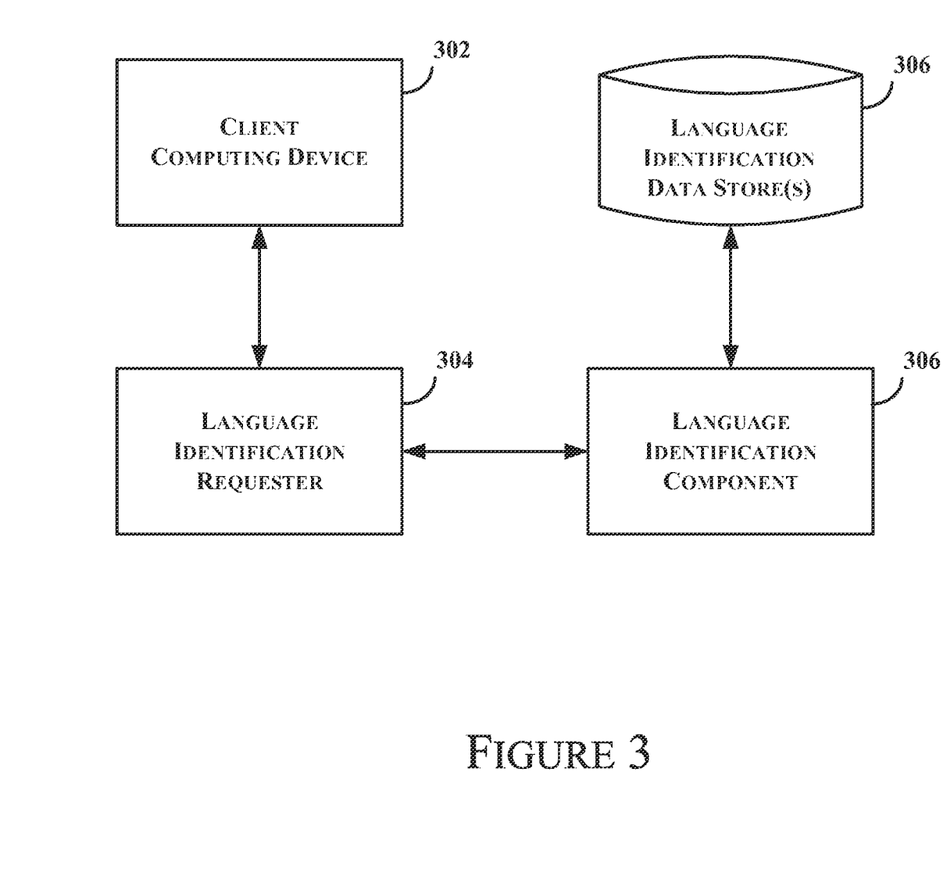
FIG. 3 provides an overview of components in accordance with one or more embodiments of the present disclosure.

FIG. 3 provides an overview of components in accordance with one or more embodiments of the present disclosure. In accordance with one or more embodiments, the language tag used at step 102 of FIG. 1A may be a language tag that identifies a language preference of a user of client computing device 302. Component 304 may be a computing device that initiates a language identification request directed to language identification component 306. By way of a non-limiting example, requester 304 may be a system, application, etc., that provides content to client computing device 302, such as a server computer that provides content, e.g., a web page or other content, to a client computing device 302. Requester 304 might also be the entity that provides language support. Components 302, 304 and 306 may be provided via one or more computing devices, which may be the same computing device or different computing devices. By way of a non-limiting example, components 304 and 306 may be performed using the same or a different server computer. By way of a further non-limiting example, each component may comprise hardware, software or some combination of hardware and software.

Data store 306, which may be comprise one or more data stores, stores data for use in identifying a supported language. By way of a non-limiting example, data store 306 may comprise the user's language preference(s), which may be in the form of a list or set of language tags, which may identify an order of the user's language preference, e.g., an ordered list of language tags, each tag representing a language preference of the user. Data store 306 may further comprise a list or set of supported languages, which may be provided as a non-ordered list of language tags. Data store 306 may also comprise a set of mappings comprising one or more mappings, each mapping in the set of mappings maps, or associates, one or more language tags with one or more other language tags.

Figure 4:
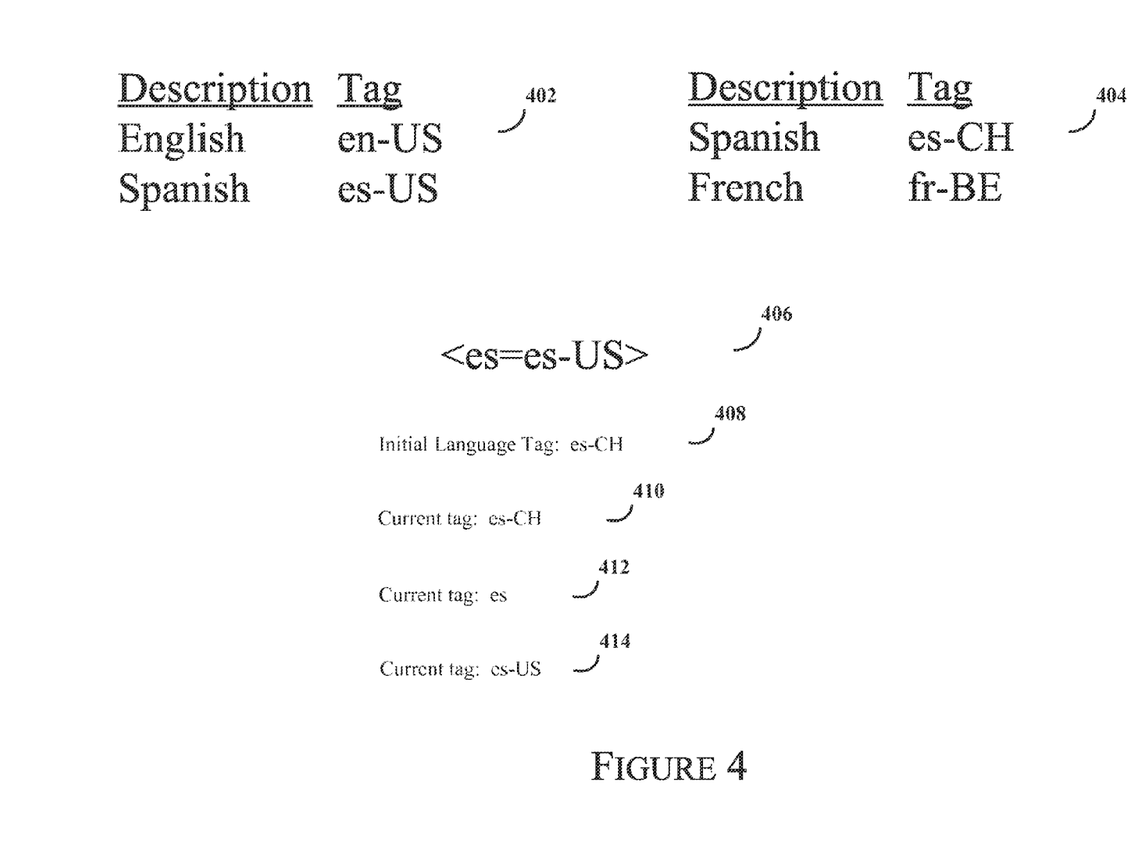
FIG. 4 provides an example of language identification using a set of supported languages and a user's set of language preferences in accordance with one or more embodiments of the present disclosure.

FIG. 4 provides an example of language identification using a set of supported languages and a user's language preferences in accordance with one or more embodiments of the present disclosure. In the example of FIG. 4, element 402 provides a list of supported languages, i.e. English as spoken in the US, en-US, and Spanish as spoken in the US, es-US, and element 404 provides a list of language preferences for the user, i.e., Spanish as spoken in Switzerland, es-CH, and French as spoken in Belgium, fr-BE. The example shown in FIG. 4, a mapping element 406 maps Spanish to Spanish as spoken in the US, i.e., <es, es-US>.

Figure 6A:
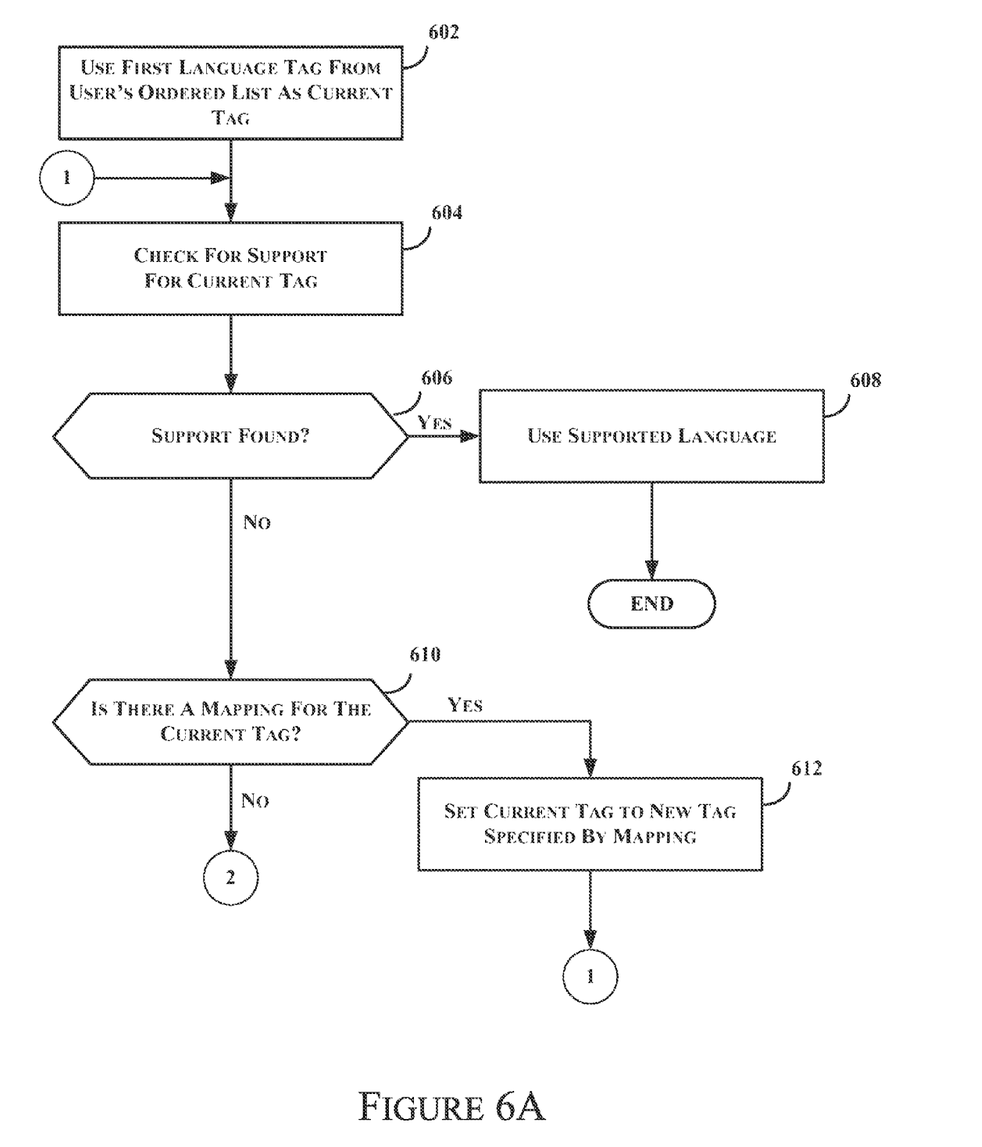
Figure 6B:
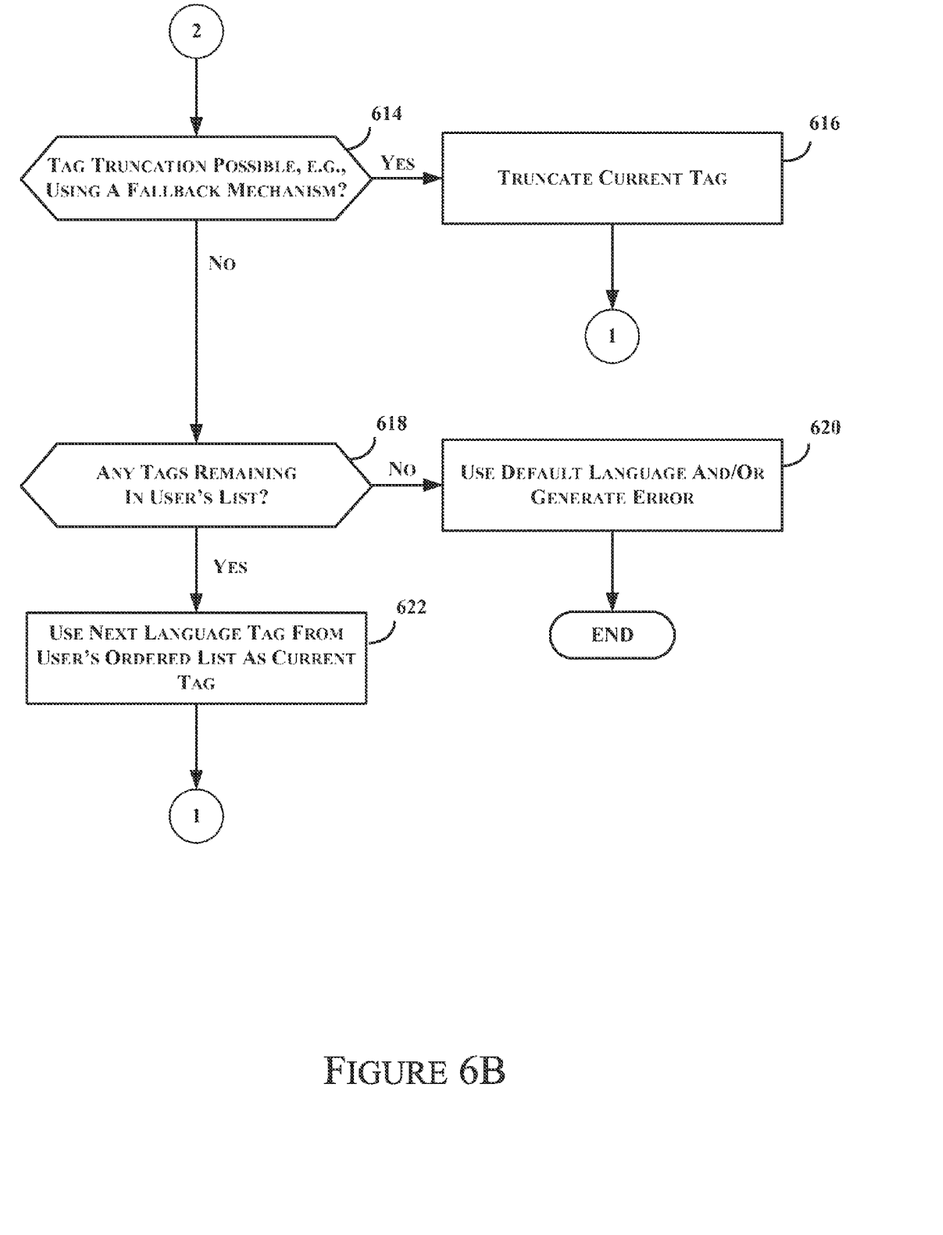

FIG. 6, which comprises FIGS. 6A and 6B, provides an example of a language identification process flow that uses user preferences and mapping in language identification in accordance with one or more embodiments of the present disclosure. With reference to step 602 of FIG. 6A, a first language tag is selected as the current language tag. In accordance with one or more embodiments, where there is a listing containing more than one language preference of the user, the list is considered to be an ordered list of preferences. By way of a non-limiting example, the first tag in the ordered list of preferences is considered to be the most preferred language of the user, and in such a case, the first tag is selected as the current tag. It should be apparent, however, that an ordering of the user's most preferred language to least preferred, or vice versa, may be designated in any manner.

Steps 104, 106, 108, 110, 112, 114 and 116 of FIG. 1 correspond, respectively, with steps 604, 606, 608, 610, 612, 614 and 616. Thus, at steps 604 and 606, a check is made to determine whether or not the language indicated by the current language tag is a supported language. If so, processing continues at step 608 to use the supported language. In the example of FIG. 4, the user's most preferred language, Spanish as spoken in Switzerland is not supported, and processing continues at step 610 to determine whether or not there is a mapping from the user's most preferred language to another language. In the example, no such mapping exists and processing continues at step 614 to determine whether or not to truncate the current tag. At step 614, a determination is made that the current tag may be truncated, and processing continues at step 618 to truncate the current tag, es-CH, which results in a current tag, es, and processing continues at step 604 to check for language support for the current tag, es. Since the current tag, es, is not supported, processing continues through steps 604 and 606 to step 610, where a determination is made that the current tag, es, may be mapped to es-US, per mapping element 406, and processing continues at step 612 to set the current tag to es-US. Processing continues at steps 604 and 606, which determine that the language indicated by the current tag is supported, and processing continues at step 608 to use the supported language.

The example shown in FIG. 4 illustrates a mapping from a more general tag to a more specific tag, which mapping may be referred to as a forward mapping and may be used to "fall forward" in identifying a supported language using language tags. Forward mapping is one example of a type of mapping that may be used with embodiments of the present disclosure. As yet another example, a mapping may associate tags that have an equal or at similar level of specificity, which may be referred to as a lateral mapping and may be used to "side step" to identify a supported language. By way of a non-limiting example, a mapping that associates French as spoken in France, fr-FR, and French as spoken in Belgium, fr-BE associates two tags having similar levels of specificity. In accordance with one or more embodiments, each subtag that is added to a language tag may provide additional specificity to a language tag, or language specification. Where two language tags have a similar level of specificity, e.g., the two tags have the same number of subtags, and are mapped to each other, the mapping is considered to be a lateral mapping; where two tags are mapped together and one tag has a lower level of specificity, e.g., a fewer umber of tags, than the other, the mapping is considered to be either a fall forward or a fall backward, depending on which tag is being converted based on the mapping. Other techniques may be used to determine a level of specificity, such as without limitation the type of subtag.

Figure 5:
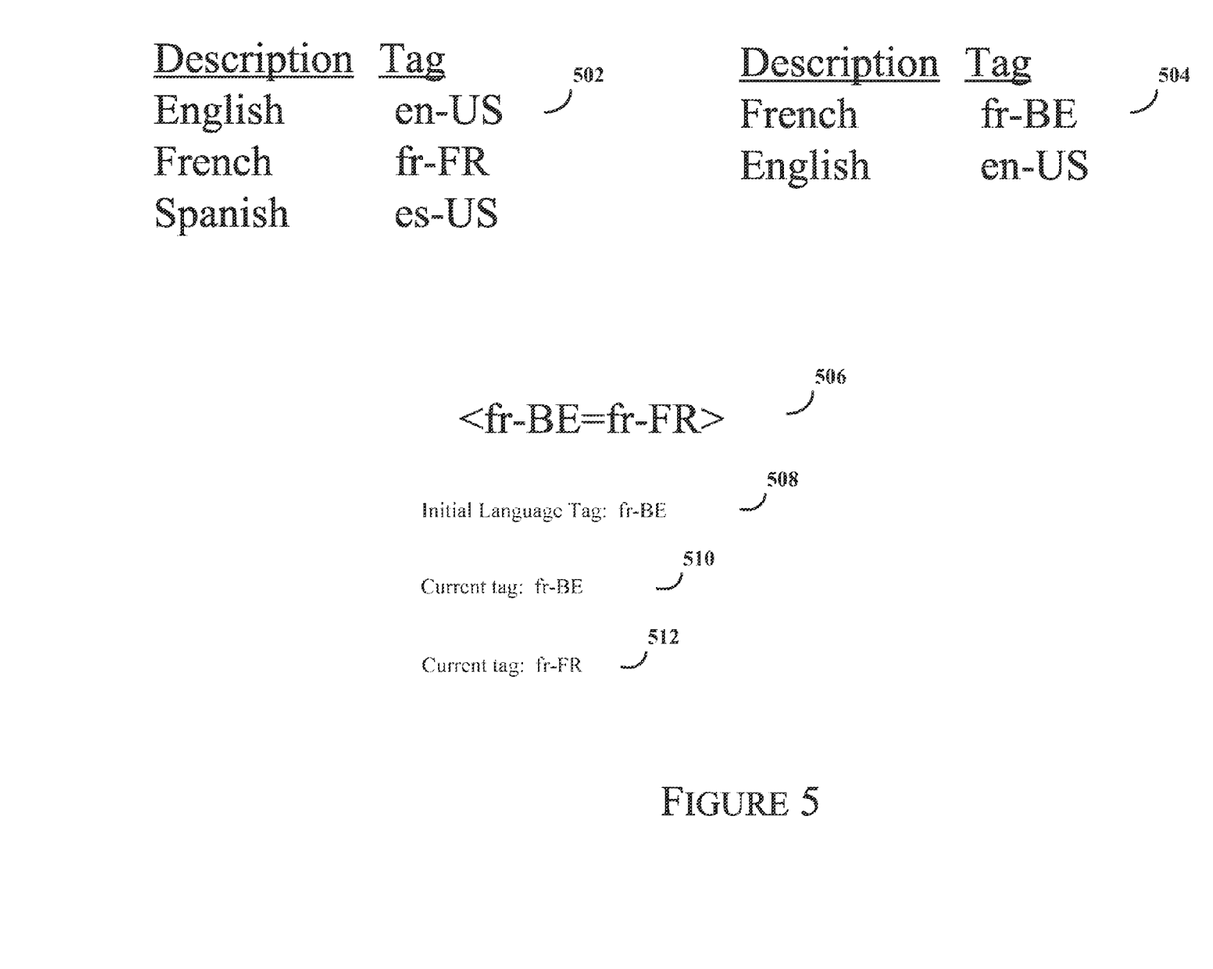
FIG. 5 provides an example of a lateral mapping in accordance with one or more embodiments of the present disclosure.

FIG. 5 provides an example of a lateral mapping in accordance with one or more embodiments of the present disclosure. In the example, mapping element 506 comprises a lateral mapping associating French as spoken in Belgium, fr-BE, with French as spoken in France, fr-FR. By way of a non-limiting example, the mapping might be considered a mapping from French as spoken in Belgium to French as spoken in France. Generally speaking, the mapping described herein associates one or more languages, and may be used to substitute one language identified in the mapping with another language identified in the mapping.

As discussed herein, in accordance with one or more embodiments, a set of tags that identify a user's language preferences may be processed as an ordered list, from most preferred to least preferred languages, and the list of supported languages are considered in light of the user's preferences. By way of one non-limiting example, an order indicated in a list of supported languages may be considered over the order of preference of a user. It should be apparent that the present disclosure is not limited to this approach, and any technique may be used to select a tag to be a current tag for use in the process flows of FIGS. 1 and 6.

In the example of FIG. 5, element 504 identifies English as spoken in the US as one of the user's language preferences and element 502 identifies English as spoken in the US as the first of the supported languages. As one option, where an order of preference of the entity providing the language support may be weighted more than a user's preference, English as spoken in the US may be the language identified for use with the user. As yet another option, each entry in one or more lists may be given a weighting, which weighting may be used to select a language tag from one list or a set of lists.

Assume for the sake of the following description, the purposes of illustration only, that the order of entries in element 504 represents an order of preference, such that the most preferred language of the user is French as spoken in Belgium, or fr-BE, and that the user's language preferences, as a whole, are given more weight than any language preference(s) of the entity providing the language support, if a preference even exists. Element 502 provides an indication of the supported languages, i.e., English as spoken in the US, en-US, French as spoken in France, fr-ER, and Spanish is spoken in the US, es-US.

As illustrated by elements 508 and 510, the tag associated with the most preferred language, i.e., fr-BE, is selected to be the current tag. With reference to FIG. 6A and since the user' most preferred language is not a supported language, the current tag is modified, or converted, from fr-BE to fr-FR at step 612 using the mapping indicated by element 506. The mapping results in the current tag being modified to be fr-FR, as indicated by element 512, and results in French as spoken in France being selected for the user. As illustrated by the example, a lateral mapping may provide a mechanism for selecting a language that may be close to a language preferred by the user. In the example shown in FIG. 5, while the user indicated that English as spoken in the US could be used, the mapping provided in element 506 results a language being selected that more closely resembles the user's most preferred language. Thus, the user may be presented with content using a French variant instead of content being presented in English as spoken in the US, which is not at all similar to the user's most-preferred language.

As illustrated by the example provided of FIG. 5, the entity that is providing the language support need not provide both variants of French, since the mapping provided in accordance with embodiments of the present disclosure allows it to "reuse" another language, e.g., French as spoken in France, that closely relates to the one requested, e.g., French as spoken in Belgium. Mapping, e.g., lateral, forward, or backward mapping, may also allow an entity providing language support to pick and choose those languages that it wishes to provide support, e.g., where the language difference is important and/or where there is other justification, such as a business justification, for doing so. In a case of a legacy product, mapping may be used to map language tags used by the legacy product to a language tag that conforms to a current standard and/or syntax, thus avoiding the need to modify the legacy product.

Figure 7:
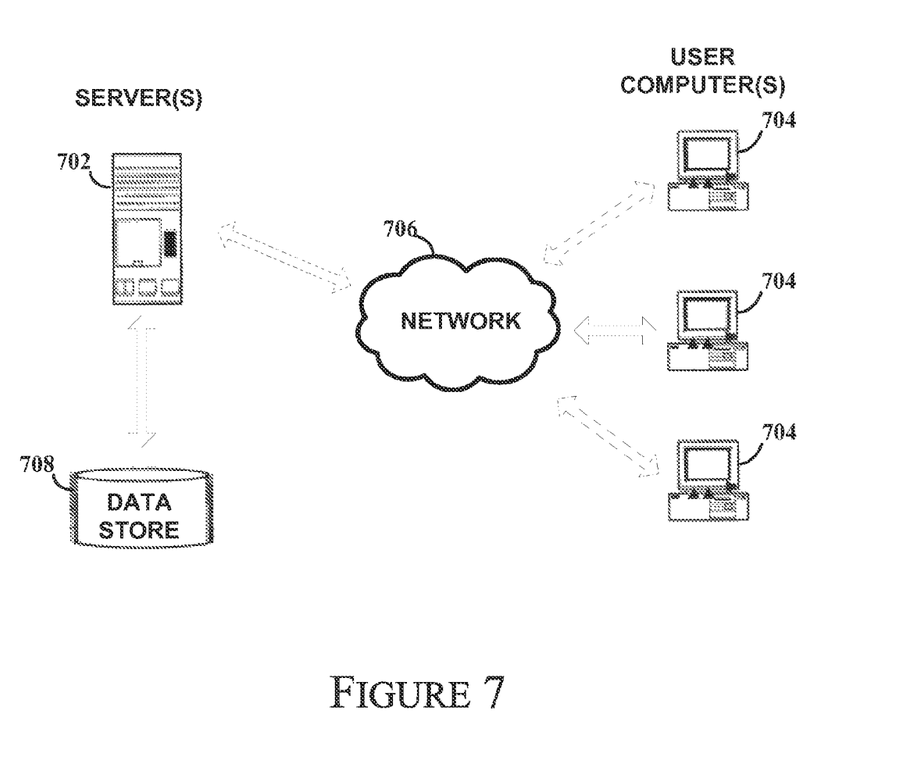
FIG. 7 illustrates some components that can be used in connection with one or more embodiments of the present disclosure.

FIG. 7 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 702 can be configured to execute program code, instructions, etc. to provide functionality in accordance with one or more embodiments of the present disclosure.

Computing device 702 can serve content to user computing devices 704 using a browser application via a network 706. Data store 708, which can include data store 104, can be used to store data such as that stored in data store(s) 306, program code to configure a server 702, etc.

The user computing device 704 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 702 and the user computing device 704 can include one or more processors, memory, a removable media reader, network interface, display and interface, and one or more input devices, e.g., keyboard, keypad, mouse, etc. and input device interface, for example. One skilled in the art will recognize that server 702 and user computing device 704 may be configured in many different ways and implemented using many different combinations of hardware, software, or firmware.

In accordance with one or more embodiments, a computing device 702 can make a user interface available to a user computing device 704 via the network 706. The user interface made available to the user computing device 704 can include content items, or identifiers (e.g., URLs) selected for the user interface in accordance with one or more embodiments of the present invention. In accordance with one or more embodiments, computing device 702 makes a user interface available to a user computing device 704 by communicating a definition of the user interface to the user computing device 704 via the network 706. The user interface definition can be specified using any of a number of languages, including without limitation a markup language such as Hypertext Markup Language, scripts, applets and the like. The user interface definition can be processed by an application executing on the user computing device 704, such as a browser application, to output the user interface on a display coupled, e.g., a display directly or indirectly connected, to the user computing device 704.

In an embodiment the network 706 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Figure 8:
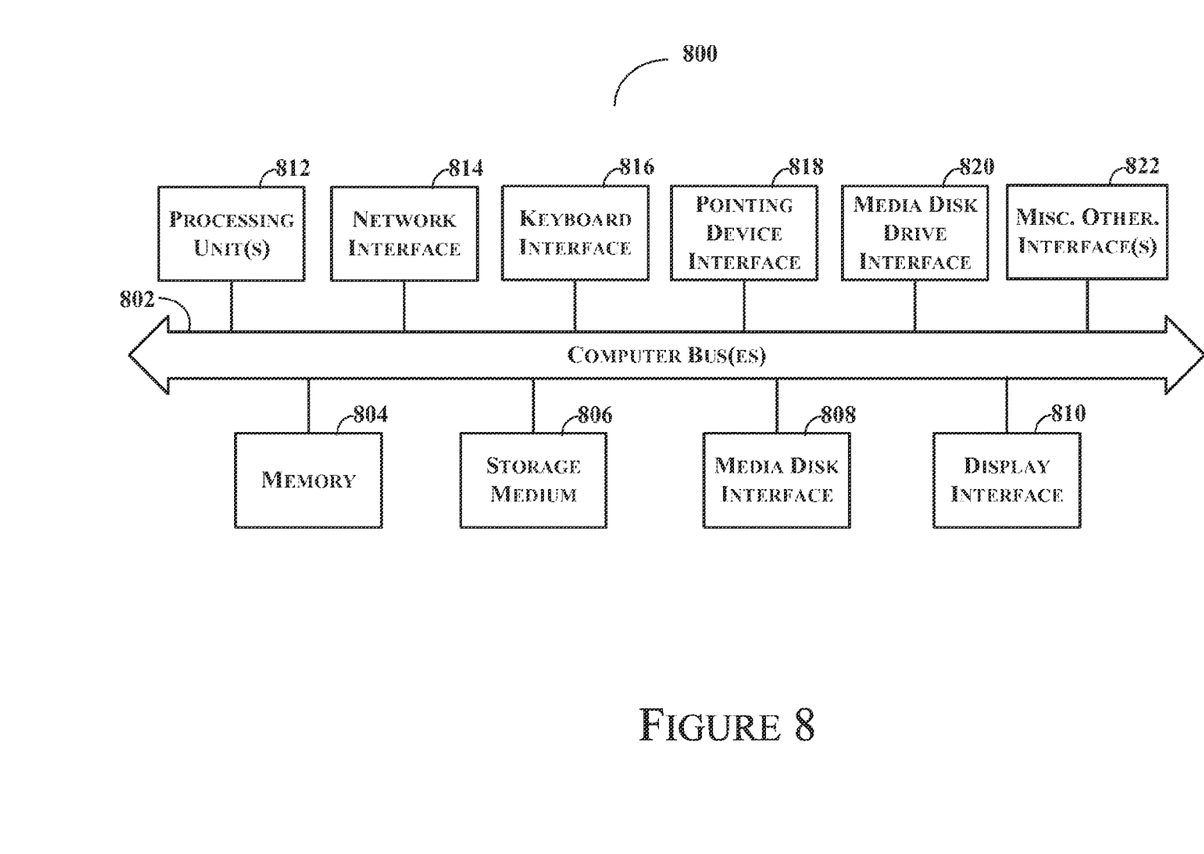
FIG. 8 is a detailed block diagram illustrating an internal architecture of a computing device in accordance with one or more embodiments of the present disclosure.

It should be apparent that embodiments of the present disclosure can be implemented in a client-server environment such as that shown in FIG. 8. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

FIG. 8 is a detailed block diagram illustrating an internal architecture of a computing device, e.g., a computing device such as server 702 or user computing device 704, in accordance with one or more embodiments of the present disclosure. As shown in FIG. 8, internal architecture 800 includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), etc., media disk drive interface 820 as an interface for a drive that can read and/or write to media including removable media such as floppy, CD-ROM, MD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, computer-readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
in response to a request to identify a supported language to display content by a client application at a client computing device, the supported language having a set of translations for use in translating the content, at least one server computing device making a determination, using a current language tag, that a language referenced by the current language tag is not the supported language, the current language tag comprising one or more subtags, each subtag providing language identification information;
in response to making the determination that the language referenced by the current language tag is not the supported language, the at least one server computing device performing elements comprising:
accessing a stored set of mappings comprising one or more mappings, each mapping associating a first language tag referencing a first language with a second language tag referencing a second language that differs from the first language;

determining whether or not a mapping in the set of mappings includes the current language tag referencing the first language as one of the first and second language tags and a new language tag referencing the second language that differs from the first language as the other of the first and second language tags;

using the new language tag as the current language tag, the new language tag identifying the second language that differs from the first language as the supported language; and in response to the request, identifying the supported language to use in translating the content to be displayed by the client application at the client computing device.

2. The method of claim 1, the identifying the supported language to use in translating the content to be displayed by the client application at the client computing device further comprising:

in response to determining that there is no mapping in the set of mappings that includes the current language tag, removing, by the at least one server computing device, at least one subtag from the current language tag to form a truncated language tag; and in response to determining that a language referenced by the truncated language tag is not the supported language, the at least one computing device repeating the elements of accessing, determining and using.

3. The method of claim 1, wherein the mapping that includes the current language tag as one of the first and second language tags comprises a lateral mapping.

4. The method of claim 1, wherein the mapping that includes the current language tag as one of the first and second language tags comprises a forward mapping.

5. The method of claim 1, wherein the current language tag is selected based on a user's language preferences.

6. The method of claim 5, wherein the current language tag is selected from an ordered language tag list representing the user's language preferences.

7. The method of claim 1, further comprising:
determining whether or not the language referenced by the current language tag is the supported language further comprising determining whether or not the current language tag is one of the language tags in a language tag listing, wherein each language supported by an entity providing language support is represented in the language tag listing, each language tag in the listing referencing a language supported by the entity.

8. A system comprising:
at least one server computing device, each server computing device comprising a processor and a storage medium for tangibly storing thereon program logic for execution by the processor, the stored program logic comprising:

making logic executed by the processor for making, in response to a request to identify a supported language to display content by a client application at a client computing device, the supported language having a set of translations for use in translating the content, a determination, using a current language tag, that a language referenced by the current language tag is not the supported language, the current language tag comprising one or more subtags, each subtag providing language identification information;

in response to making the determination that the language referenced by the current language tag is not the supported language, the stored program logic further comprising:

accessing logic executed by the processor for accessing a stored set of mappings comprising one or more mappings, each mapping associating a first language tag referencing a first language with a second language tag referencing a second language that differs from the first language;

determining logic executed by the processor for determining whether or not a mapping in the set of mappings includes the current language tag referencing the first language as one of the first and second language tags and a new language tag referencing the second language that differs from the first language as the other of the first and second language tags;

using logic executed by the processor for using the new language tag as the current language tag, the new language tag identifying the second language that differs from the first language as the supported language; and identifying logic executed by the processor for identifying, in response to the request, the supported language to use in translating the content to be displayed by the client application at the client computing device.

9. The system of claim 8, the identifying logic executed by the processor to identify the supported language to use in translating the content to be displayed by the client application at the client computing device further comprising:

removing logic executed by the processor for removing, in response to determining that there is no mapping in the set of mappings that includes the current language tag, at least one subtag from the current language tag to form a truncated language tag; and repeating logic executed by the processor for repeating, in response to determining that a language referenced by the truncated language tag is not the supported language, the elements of accessing, determining and using.

10. The system of claim 8, wherein the mapping that includes the current language tag as one of the first and second language tags comprises a lateral mapping.

11. The system of claim 8, wherein the mapping that includes the current language tag as one of the first and second language tags comprises a forward mapping.

12. The system of claim 8, wherein the current language tag is selected based on a user's language preferences.

13. The system of claim 12, wherein the current language tag is selected from an ordered language tag list representing the user's language preferences.

14. The system of claim 8, the stored program logic further comprising:
determining logic executed by the processor for determining whether or not the language referenced by the current language tag is the supported language by determining whether or not the current language tag is one of the language tags in a language tag listing, wherein each language supported by an entity providing language support is represented in the language tag listing, each language tag in the listing referencing a language supported by the entity.

15. A computer readable non-transitory storage medium for tangibly storing thereon computer readable instructions that when executed cause a server computing device to:

in response to a request to identify a supported language to display content by a client application at a client computing device, the supported language having a set of translations for use in translating the content, make a determination, using a current language tag, that a language referenced by the current language tag is not the supported language, the current language tag comprising one or more subtags, each subtag providing language identification information;

in response to making a determination that the language referenced by the current language tag is not the supported language, perform elements comprising:

accessing a stored set of mappings comprising one or more mappings, each mapping associating a first language tag referencing a first language with a second language tag referencing a second language that differs from the first language;

determining whether or not a mapping in the set of mappings includes the current language tag referencing the first language as one of the first and second language tags and a new language tag referencing the second language that differs from the first language as the other of the first and second language tags;

using the new language tag as the current language tag, the new language tag identifying the second language that differs from the first language as the supported language; and in response to the request, identify the supported language to use in translating the content to be displayed by the client application at the client computing device.

16. The computer readable non-transitory storage medium of claim 15, the computer readable instructions that when executed cause the server computing device to the identify the supported language to use in translating the content to be displayed by the client application at the client computing device further cause the server computing device to:

in response to determining that there is no mapping in the set of mappings that includes the current language tag, remove at least one subtag from the current language tag to form a truncated language tag; and in response to determining that a language referenced by the truncated language tag is not the supported language, repeat the elements of accessing, determining and using.

17. The computer readable non-transitory storage medium of claim 15, wherein the mapping that includes the current language tag as one of the first and second language tags comprises a lateral mapping.

18. The computer readable non-transitory storage medium of claim 15, wherein the mapping that includes the current language tag as one of the first and second language tags comprises a forward mapping.

19. The computer readable non-transitory storage medium of claim 15, wherein the current language tag is selected based on a user's language preferences.

20. The computer readable non-transitory storage medium of claim 19, wherein the current language tag is selected from an ordered language tag list representing the user's language preferences.

21. The computer readable non-transitory storage medium of claim 15, the instructions further comprising instructions to cause the server computing device to:

determine whether or not the language referenced by the current language tag is the supported language by determining whether or not the current language tag is one of the language tags in a language tag listing, wherein each language supported by an entity providing language support is represented in the language tag listing, each language tag in the listing referencing a language supported by the entity.

* * * * *